UNITED STATES PATENT OFFICE.

ROYAL B. EMBREE, OF KINGSPORT, TENNESSEE.

PROCESS OF PRODUCING PULP FOR PAPER OR THE LIKE.

1,203,511.  Specification of Letters Patent.  Patented Oct. 31, 1916.

No Drawing.  Application filed June 3, 1916.  Serial No. 101,592.

*To all whom it may concern:*

Be it known that I, ROYAL B. EMBREE, a citizen of the United States, residing at Kingsport, in the county of Sullivan and State of Tennessee, have invented certain new and useful Improvements in Processes of Producing Pulp for Paper or the like, of which the following is a specification.

This invention has for its object to produce a cheap pulp for paper, such as coarser types of wrapping paper, pulp board, building board, insulating materials and the like, by utilizing various forms of wood that are freely available as waste materials from other industrial processes, such as waste pieces from saw mills, leached wood from tannic acid mills, or the like.

In carrying out the process, the wood is first hogged or shredded by treating it in cord wood size, for instance, in the manner usually followed in reducing wood to proper physical condition for leaching. That is to say, reduced to parts small enough to afford easy access of the leaching water. If this reduction is not resorted to as a step preliminary to the usual leaching process, for the extract of tannic acid, the wood should be specially treated to so reduce it. After being so reduced, and while it is yet moist, it is further reduced between stones to a pulpable condition, this step in the process being carried on as far as possible without cutting or destroying the fiber. The effect of this step is to reduce the wood not to ultimate fibers as would result from the stone treatment following cooking in the presence of a chemical, but to reduce it to what may be termed strands of fiber which are longer and stronger than the ultimate fiber of the wood. After reducing the stock to this pulpable form, it is treated to neutralize the remanent tannic acid, if desired, by subjecting it to a bath, not under pressure, of caustic soda or other alkali, not strong enough to materially reduce the silica, starches or other binding matter, but in quantity just sufficient to neutralize any remaining tannic acid. Lime is then preferably added, as for instance in the form of milk of lime to act as a bleach. The pulp is now ready for the final mechanical steps incident to paper or board making, such as beating, screening, etc., and it may be immediately subjected to these steps, or it may be sold as paper stock to the mills making such goods.

I have found in practice that wood fiber treated as above described, produces a very strong paper of coarse texture, in a very cheap manner, and by the use of what is an unprofitable refuse in one or more industrial processes, without resorting to the cooking steps and without requiring expensive chemicals.

I claim:—

1. The art of producing coarse texture paper stock which consists in shredding the wood until reduced to about leaching size, soaking the wood so reduced to thoroughly moisten it, then rubbing the reduced wood while moist, until reduced to fibrous strands, subjecting the wood to a tannic acid neutralizing bath without reducing its binding matter, and finally pulping and forming into paper, the stock thus produced.

2. The art of producing coarse texture paper stock which consists in shredding wood until it is reduced by separation lengthwise of its fibers, into small portions readily soaked, then stone-rubbing the portions so produced, while they are thoroughly moistened, until they attain the herein-described fibrous-strand pulpable condition, subjecting the wood to a neutralizing bath without reducing its binding matter, and then pulping the material, substantially as herein set forth.

The foregoing specification signed at Kingsport, Tennessee, this 13th day of May, 1916.

ROYAL B. EMBREE.